United States Patent
Huang

(10) Patent No.: US 7,281,256 B2
(45) Date of Patent: Oct. 9, 2007

(54) DISK TRANSPORT MECHANISM FOR A DISK DRIVE

(75) Inventor: Hui-Chu Huang, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 382 days.

(21) Appl. No.: 11/082,819

(22) Filed: Mar. 18, 2005

(65) Prior Publication Data

US 2006/0059499 A1 Mar. 16, 2006

(30) Foreign Application Priority Data

Sep. 14, 2004 (TW) .............................. 93127747 A

(51) Int. Cl.
*G11B 17/04* (2006.01)

(52) U.S. Cl. ...................................... 720/624; 720/625

(58) Field of Classification Search ................ 720/624, 720/625, 619
See application file for complete search history.

(56) References Cited

U.S. PATENT DOCUMENTS 6,636,470 B1 * 10/2003 Sasada et al. ............... 720/622
2004/0148618 A1 * 7/2004 Tsuchiya ...................... 720/621

FOREIGN PATENT DOCUMENTS

| JP | 2002140850 A | * | 5/2002 |
| JP | 2003123358 A | * | 4/2003 |
| JP | 2003296993 A | * | 10/2003 |
| WO | WO9908274 A2 | * | 2/1999 |

* cited by examiner

*Primary Examiner*—William J Klimowicz
(74) *Attorney, Agent, or Firm*—Troxell Law Office, PLLC

(57) ABSTRACT

A disk drive includes a spacer unit mounted at one end of a roller-mounting frame for spacing a disk transport roller apart from a plate member. The spacer unit has a predetermined length greater than the greatest outer diameter of the transport roller.

10 Claims, 5 Drawing Sheets

DISK TRANSPORT MECHANISM FOR A DISK DRIVE

FIELD OF THE INVENTION

The invention relates to a disk transport mechanism for a disk drive of slot-in type, more particularly to the disk transport mechanism having a spacer unit for spacing a disk transport roller apart from a plate member, thereby preventing untimely wearing of the transport roller.

BACKGROUND OF THE INVENTION

An optical disk drive of slot-in type is generally installed in a notebook computer or in an audio-and-video instrument of an automobile for reproducing the information recorded in an optical recording media, such as playing songs from a CD.

Referring to FIGS. 1 and 2, perspective and bottom views of a conventional disk drive of slot-in type are shown to include a casing formed with a disk entrance-and-exit slot 3, and a disk transport mechanism 6 disposed in the casing adjacent to the entrance-and-exit slot 3. The disk transport mechanism 6 includes an upwardly biased roller-mounting frame 606 pivoted to a plate member 8 of the disk drive 2 via a frame-mounting shaft 12. A disk transport roller 602 is journalled to an inner end of the roller-mounting frame 606 (see also in FIG. 3A) and generally contacts slidably the plate member 8 by virtue of upwardly biased action of a spring. The disk transport roller 602 has a coupling end exposed from the roller-mounting frame 606 (see FIG. 2). The disk transport mechanism 6 further includes a gear transmission system 14 and a driving motor 10. The gear transmission system 14 includes a driven gear 604 fixed to the coupling end of the transport roller 602, and a driving gear 1402 meshed with the driven gear 604. Since the driving gear 1402 is operably associated with the driving motor 10, actuation of the latter results in rotation of the disk transport roller 602. Under this condition, when an optical disk 4 is between the plate member 8 and the transport roller 602 via the entrance-and-exit slot 3 (see FIG. 3B), the optical disk 4 will be drawn into or ejected from the disk drive 2 upon rotation of the transport roller 602 due to applying force on the optical disk 4. The roller-mounting frame 606 further moves to allow the transport roller 602 to shift to a lower position against the urging force of the spring, thereby spacing the transport roller 602 apart from the disk 4 when the optical disk 4 is moved to a reading position (see FIG. 3C).

Some disadvantages resulting from the use of the aforesaid conventional disk drive are as follows:

(a) The transport roller 602 is susceptible to wear due to constant contact with the plate member 8 when they are not spaced apart by a disk;

(b) The driving and driven gears 1402, 604 cooperatively define a first distance L1 between the axes thereof when the transport roller 602 contacts the plate member 8;

(c) During the disk ejecting and drawing in operation, the driving and driven gears 1402, 604 cooperatively define a second distance L2. It is note that L2>L1 due to presence of the disk between the transport roller 602 and the plate member 8. In other words, it can be assumed that the driving and driven gears 1402, 604 are not fully meshed with each other during the disk ejecting or drawing in operation. Under such condition, the transport roller 604 may wobble with respect to the disk 4.

SUMMARY OF THE INVENTION

The object of the present invention is to provide an optical disk drive of slot-in type that is provided with a spacer unit which can eliminate the aforesaid disadvantages.

A disk transport mechanism is provided according to the present invention for use a disk drive which includes a casing formed with an entrance-and-exit slot. The disk transport mechanism includes: a plate member adapted to be disposed stationarily within the casing, and extending inwardly from the entrance-and-exit slot; a disk transport roller; a frame-mounting shaft; a roller-mounting frame adapted to be pivoted to the casing via the frame-mounting shaft so as to dispose the roller-mounting frame below the plate member, the roller-mounting frame having two inner roller-mounting ends that are distal from the entrance-and-exit slot and that holds the transport roller thereon such that the transport roller extends in a direction parallel with the frame-mounting shaft, and at least a spacer unit extending outwardly from one of the roller-mounting ends. The spacer unit has a predetermined length measured in a radial direction of the roller-mounting end such that when the transport roller is moved to an upper position by virtue of upward swinging of the roller-mounting frame, the spacer unit abuts against the plate member to form a gap between the transport roller and the plate member. A driving motor is provided for rotating the transport roller.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 4:
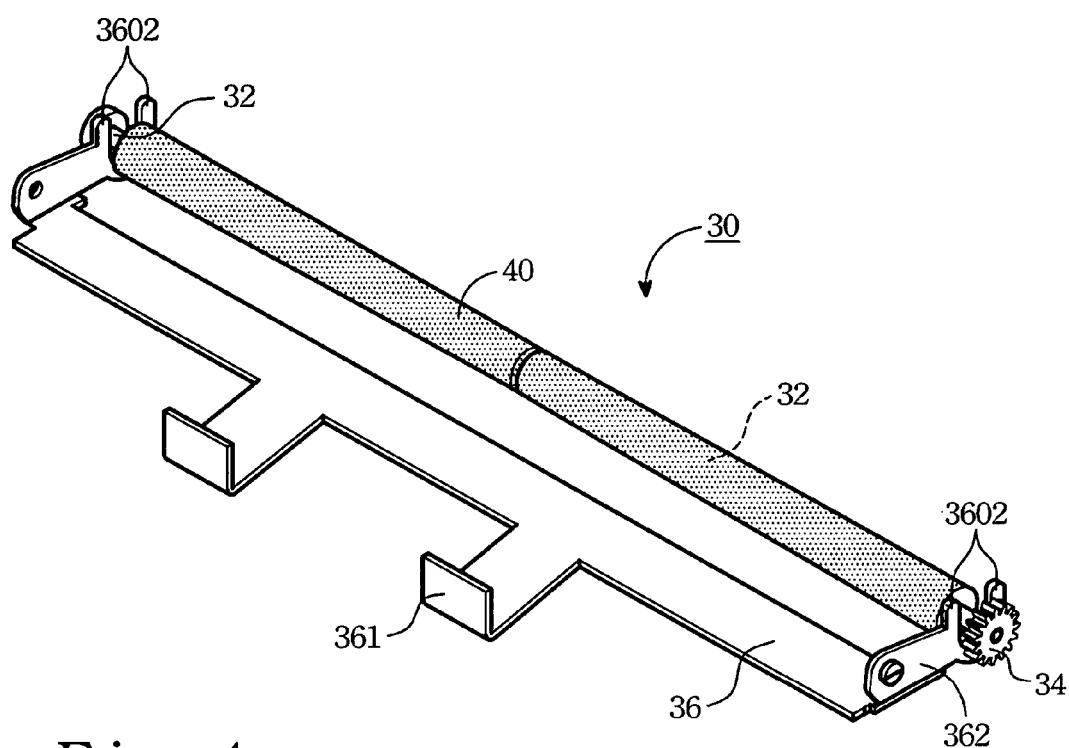
FIG. 4 is a perspective view of a disk transport roller and a roller-mounting frame employed in a disk drive of the present invention.
Figure 5:
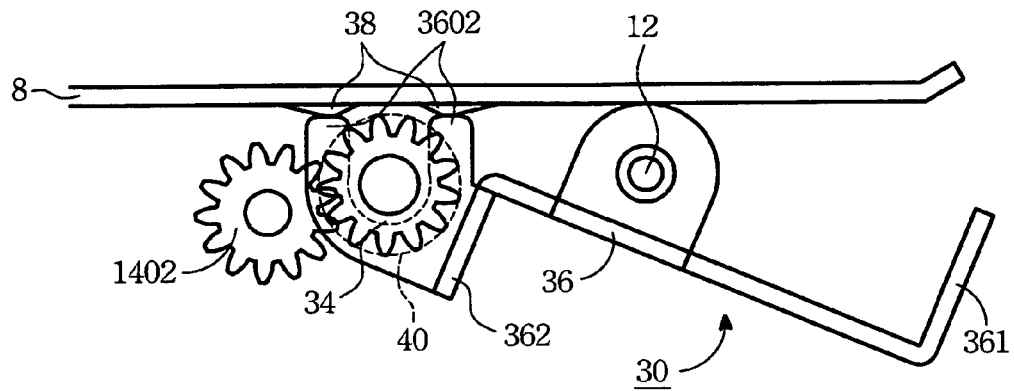
FIG. 5 is a fragmentary sectional view of the disk drive of the present invention with an outer casing removed, illustrating the relationship between a driven and driving gears when a disk transport roller is disposed normally and when no disk is inserted thereinto.

Referring to FIGS. 4 and 5, the preferred embodiment of an optical disk drive according to the present invention is shown and generally installed in a notebook computer (not shown) or in an audio-and-video instrument of an automobile for reproducing the information recorded in an optical disk 4 such as playing out songs from a CD. The disk drive is of slot-in type, and is a CD or DVD player.

Figure 1:
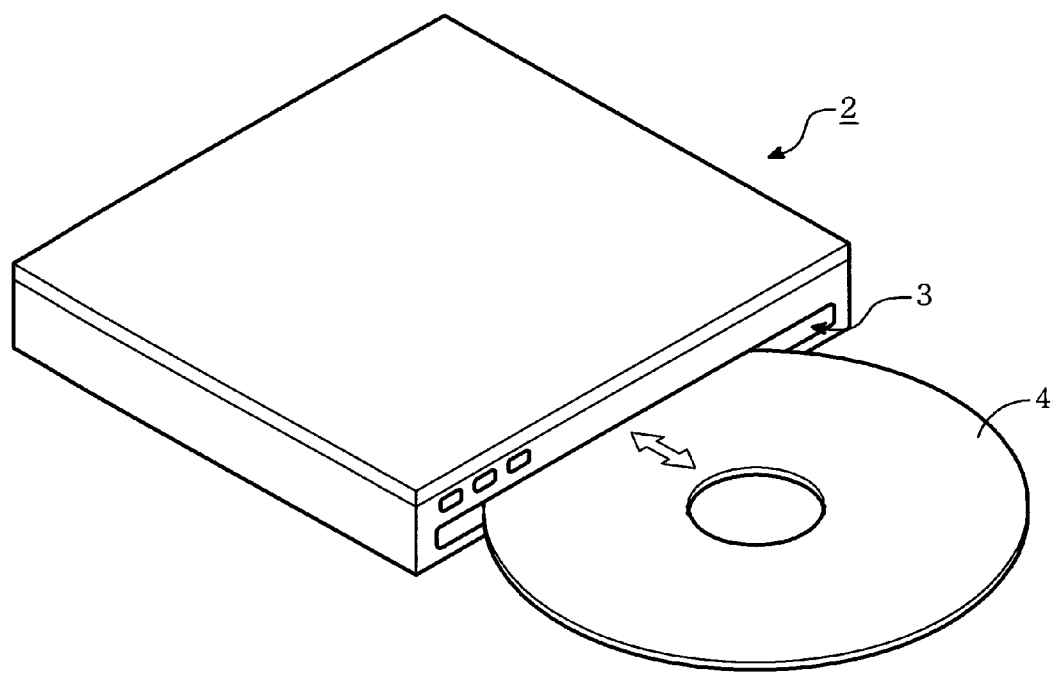
FIG. 1 shows a perspective view a conventional disk drive.
Figure 2:
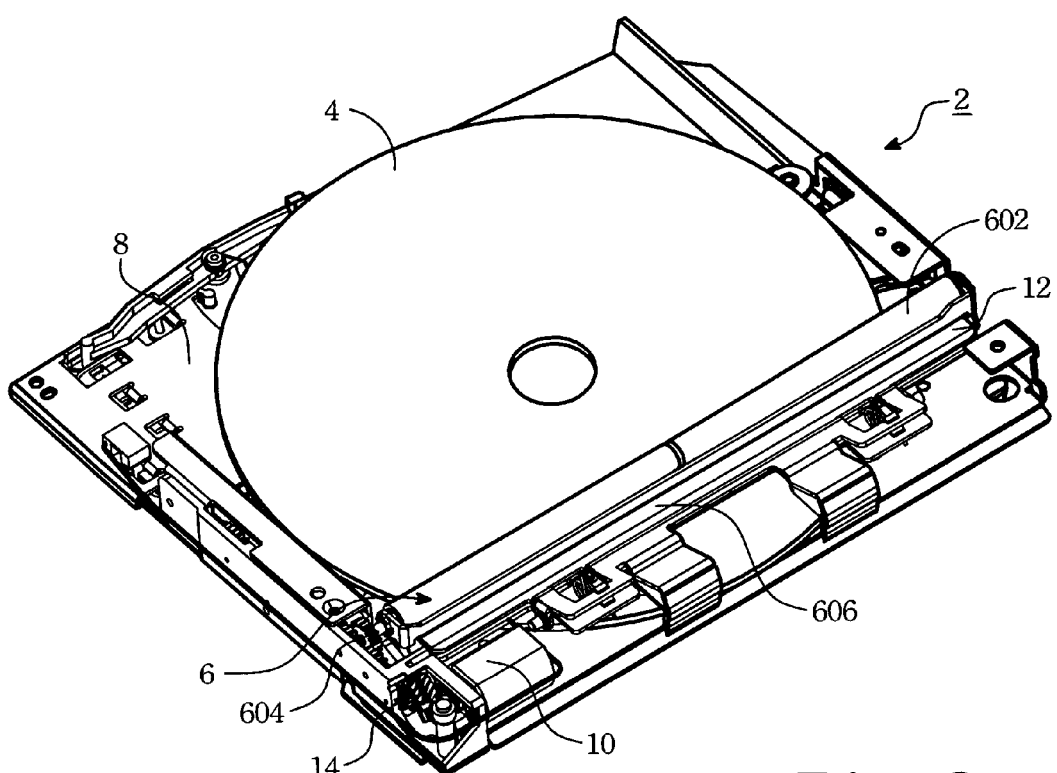
FIG. 2 is a partly exploded and bottom view with an outer casing removed, illustrating an interior of the conventional disk drive.
Figure 3A:
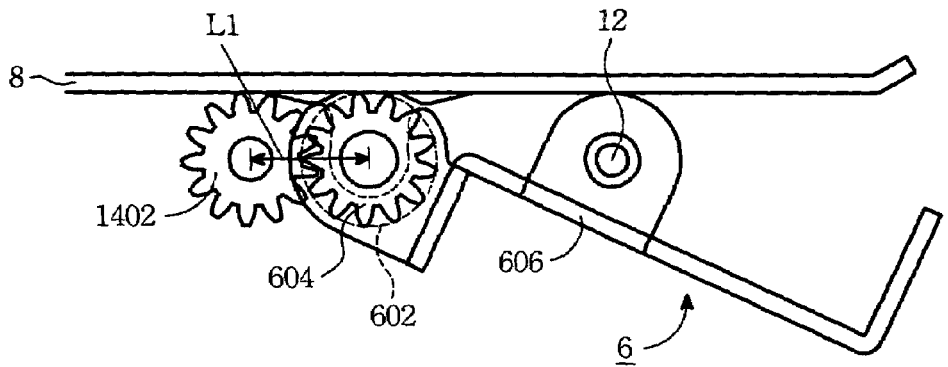
FIG. 3A is a fragmentary sectional view of the conventional disk drive with the outer casing removed, illustrating the relationship between a driven and driving gears when a disk transport roller is disposed normally and when no disk is inserted thereinto.
Figure 3B:
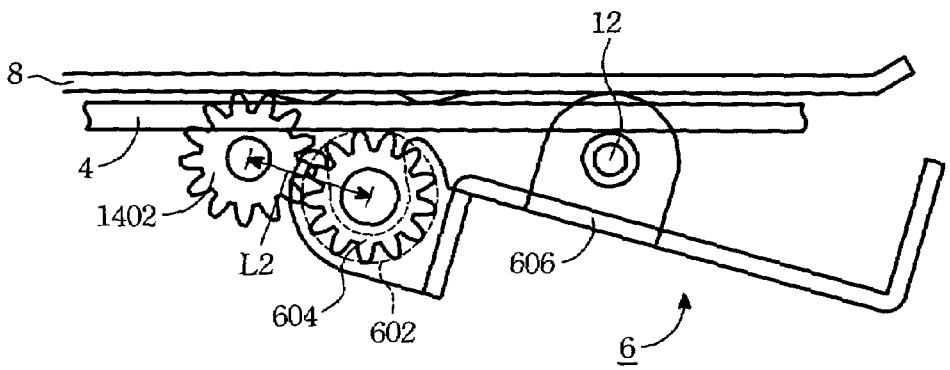
FIG. 3B is a fragmentary sectional view of the conventional disk drive with the outer casing removed, illustrating the relationship between the driven and driving gears during a disk ejecting or drawing in operation.
Figure 3C:
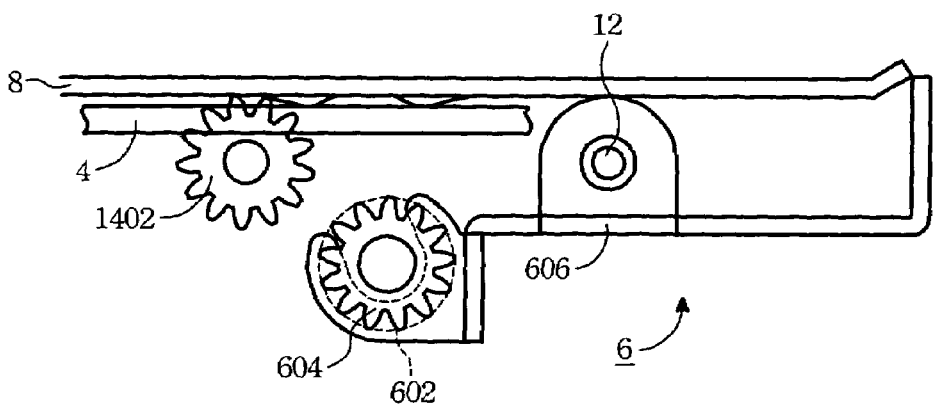
FIG. 3C is a fragmentary sectional view of the conventional disk drive with the outer casing removed, illustrating the relationship between the driven and driving gears when the disk transport roller is moved to a lower position to permit reading operation of the inserted disk.

As illustrated, the preferred embodiment includes a casing formed with an entrance-and-exit slot (see FIG. 1), and a disk transport mechanism 30. The transport mechanism 30 includes a roller-mounting frame 36, a disk transport roller 32 sleeved by a roller-protective sheath 40, a gear transmission system, and a driving motor (not shown). A plate member 8 is disposed stationarily within the casing and extends inwardly from the entrance-and-exit slot of the casing. The roller mounting frame 36 is pivoted to the plate member 8 via a frame-mounting shaft 12. The frame 36 has two inner roller-mounting ends 362 that are distal from the entrance-and-exit slot and that hold the transport roller 32 such that the transport roller 32 extends in a direction parallel with the frame-mounting shaft 12, two outer shielding ends 361 proximate to the entrance-and-exit slot, and two spacer units 3602 extending outwardly and respectively from opposite ends of the roller-mounting ends 362. Preferably, the outer shielding ends 361 should be provided with stop members which block the entrance-and-exit slot when the disk drive of the present invention is loaded with an optical disk.

Each of the spacer units 3602 has a predetermined length measured in a radial direction of the transport roller 32 such that the spacer units 3602 abuts against the plate member 8 by virtue of upwardly-biased action of a spring (not shown) so as to form a gap between the transport roller 32 and the plate member 8 (see FIG. 5).

Figure 7:
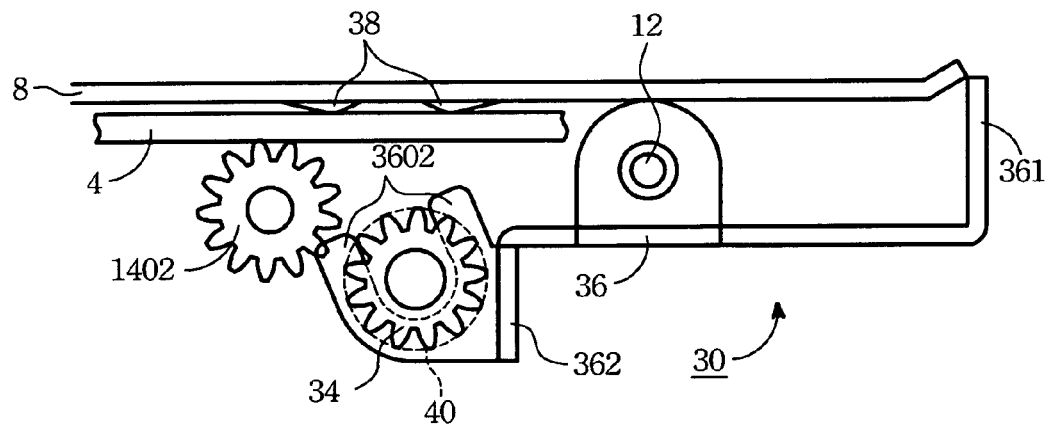
FIG. 7 is a fragmentary sectional view of the disk drive of the present invention with the outer casing removed, illustrating the relationship between the driven and driving gears when the disk transport roller is moved to a lower position to permit reading operation of the inserted disk.

The gear transmission system includes a driven gear 34 fixed to one end of the transport roller 32 and a driving gear 1402 meshed with the driven gear 34. The driving gear 1402 is operably associated with the driving motor in such a manner that actuation of the driving motor results in rotation of the transport roller 32 so as to draw an optical disk 4 into the casing or eject the disk 4 from the casing. The roller-mounting frame 36 is also movable to a lower position against the urging action of the spring, in which the transport roller 32 is spaced apart from the optical disk 4, thereby disposing the latter under a readable condition (see FIG. 7). Preferably, the roller-protective sleeve 40 is made from elastomeric materials, such as rubber, and the transport roller 32 has an axial length greater than a longitudinal length of the entrance-and-exist slot such that the transport roller 32 extends along the longitudinal length of the entrance-and-exit slot. Alternatively, the transport roller 32 can also be made from elastomeric materials, such as rubber. Under this condition, no roller-protective sheath is sleeved on the transport roller 32. Since the driving motor and how the motor is activated for rotating the transport roller and moving the roller-mounting frame 36 between the upper and lower positions, is not the relevant feature of the present invention, detailed description of the same is omitted herein for the sake of brevity.

Referring again to FIG. 5, each of the spacer units has a U-shaped configuration with two straight portions and a curved portion interconnecting the straight portions. In order to space the transport roller 32 apart from the plate member 8, each of the straight portions should have a length greater than half of the greatest outer diameter of the transport roller 32. Preferably, two support pad units 38 are mounted on the plate member 8 for supporting the spacer unit 3602 respectively when the transport roller 32 is moved to the upper position.

Figure 6:
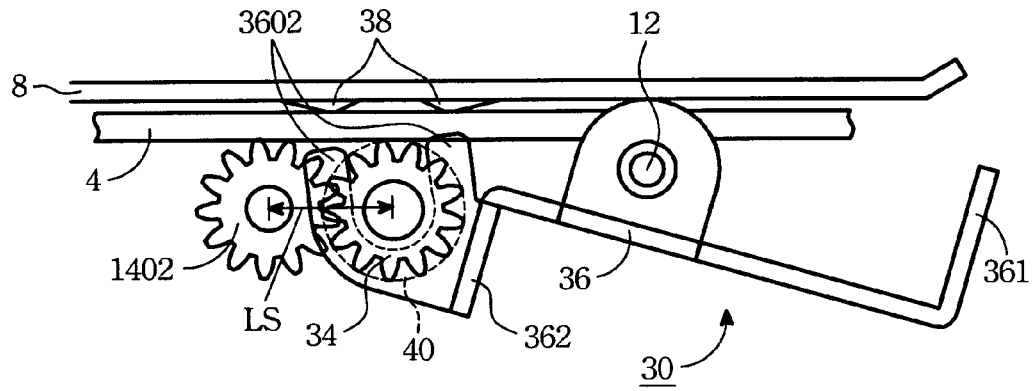
FIG. 6 is a fragmentary sectional view of the disk drive of the present invention with the outer casing removed, illustrating the relationship between the driven and driving gears during a disk ejecting or drawing in operation.

In contrast to the conventional disk drive, the position of the driving gear 1402 in the disk drive of the present invention is adjusted so as to define a first length between axes thereof when the disk drive of the present invention is not loaded with an optical disk (see FIG. 5) and that when the disk drive is loaded with the disk (see FIG. 6), the driven and driving gears 34, 1402 cooperatively define a second distance Ls which is shorter than the first distance since the gears 34, 1402 are fully meshed with each to provide a maximum rotation of the transport roller 32 for drawing the disk 4 into or ejecting the disk 4 from the casing. Under such arrangement, the driving and driven gears 1402, 34 are not fully meshed with each other when the disk drive of the present invention is not loaded with the disk. However, this does not hinder the initial rotation of the transport roller 32, since the meshing difference of the gears between the initial position and the spacer units 3602 also minimize the drawing position of the transport roller 32. In addition, the spacing distance between the driving and driven gears 1402 and 34 is also shortened when the roller-mounting frame 36 is moved to the lower position (see FIG. 7). Only a little noise is generated during meshing of the driving and driven gears 1402 and 34 by the upwardly biased action of the spring.

Note that adjusting the length of the spacer units 3602 and altering the position of the driving gear 1402 with respect to the plate member 8 in order to dispose the driving gear 1402 fully mesh with the driven gear 34 can be done by conventional known art and do not required complicated process.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A disk transport mechanism for a disk drive which includes a casing formed with an entrance-and-exit slot, the disk transport mechanism comprising:

a plate member adapted to be disposed stationarily within the casing, and extending inwardly from the entrance-and-exit slot;

a transport roller;

a frame-mounting shaft;

a roller-mounting frame adapted to be pivoted to the casing via said frame-mounting shaft so as to dispose said roller-mounting frame below said plate member, said roller-mounting frame having two inner roller-mounting ends that are distal from the entrance-and-exit slot and that holds said transport roller thereon such that said transport roller extends in a direction parallel with said frame-mounting shaft;

at least a spacer unit extending outwardly from one of said roller-mounting ends such that when said transport roller is moved to an upper position by virtue of upward swinging of said roller-mounting frame, said spacer unit abuts against said plate member to form a gap between said transport roller and said plate member; and a driving motor for rotating said transport roller.

2. The disk transport mechanism according to claim 1, further comprising a roller-protective sheath sleeved on said transport roller.

3. The disk transport mechanism according to claim 2, wherein said roller-protective sheath is made from elastomeric materials.

4. The disk transport mechanism according to claim 1, wherein the spacer unit has a predetermined length measured in a radial direction of said roller-mounting shaft, said transport roller having an outer greatest diameter, said predetermined length of said spacer unit being greater than half of said outer greatest diameter of said transport roller.

5. The disk transport mechanism according to claim 1, wherein said spacer unit has a U-shaped configuration with two straight portions and a curved portion interconnecting said two straight portions.

6. The disk transport mechanism according to claim 1, wherein said transport roller is made from rubber material.

7. The disk transport mechanism according to claim 1, wherein said driving motor includes a gear transmission system having a driven gear fixed to one end of said roller-mounting shaft and a driving gear for driving said driven gear.

8. The disk transport mechanism according to claim 7, wherein when said transport roller is moved to said upper position for biasing said spacer unit against said plate member, said driving gear being meshed with said driven gear of said transport roller.

9. The disk transport mechanism according to claim 7, wherein when said transport roller withdraws an optical disk into or ejecting the disk, said driving gear being meshed with said driven gear of said transport roller, thereby defining a second distance between axes of said driven and driving gears, said second distance being shorter than a first distance between axes of said driven and driving gears when said transport roller is moved to said upper position for biasing said spacer unit against said plate member.

10. The disk transport mechanism according to claim 1, further comprising a support pad unit mounted on said plate member for supporting said spacer unit when said transport roller is moved to said upper position.

* * * * *